United States Patent [19]

Rynik

[11] 4,095,478
[45] Jun. 20, 1978

[54] SPROCKET-WHEEL, ESPECIALLY FOR MINING MACHINES

[75] Inventor: Jan Rynik, Gliwice, Poland

[73] Assignees: Politechnika Slaska im. Wincentego Pstrowskiego, Gliwice; Rybnicka Fabryka Maszyn "Ryfama", Rybnik, both of Poland

[21] Appl. No.: 690,775

[22] Filed: May 27, 1976

[30] Foreign Application Priority Data

Jun. 4, 1975 Poland .................................. 180960

[51] Int. Cl.² ............................................ F16H 55/30
[52] U.S. Cl. ................................. 74/229; 74/243 H; 29/159.2; 198/834; 305/57; 30/381
[58] Field of Search ...................... 74/229, 243 H, 462, 74/243 R, 243 C, 243 CS, 243 DR, 243 FC, 253; 30/381–386; 305/57; 198/834; 29/159.2

[56] References Cited

U.S. PATENT DOCUMENTS

| 647,243 | 4/1900 | Anderson | 74/243 R |
|---|---|---|---|
| 839,325 | 12/1906 | Scott | 74/243 H |
| 1,970,763 | 8/1934 | Miller et al. | 74/243 H |
| 2,656,150 | 10/1953 | Lock | 74/243 H |
| 3,091,129 | 5/1963 | Bessette | 74/229 |

Primary Examiner—Carlton R. Croyle
Assistant Examiner—R. E. Gluck
Attorney, Agent, or Firm—Haseltine, Lake & Waters

[57] ABSTRACT

A sprocket wheel arrangement adopted particularly for drives in mining machines as, for example, push-plate conveyors and mining equipment. The number of teeth on the sprocket wheel is smaller than the number of seats between the working surfaces of the teeth and cooperating with chain links passing over the sprocket wheel. The seats are open from one side, and are provided with retaining walls only from the side of the teeth. The planes of bottom lands of adjacent seats intersect and form, thereby, an edge. The sprocket wheel arrangement may be used in driving systems of both coil chains and fish-plate chains.

2 Claims, 2 Drawing Figures

SPROCKET-WHEEL, ESPECIALLY FOR MINING MACHINES

BACKGROUND OF THE INVENTION

This invention relates to a sprocket-wheel, especially for chain drives of mining machines and equipments such as push-plate conveyors and mining equipment.

In known designs of sprocket-wheels the active chain links settle down in seats between the working surfaces of the teeth. The number of these seats equals to that of the teeth of the sprocket-wheel. The construction of the teeth and seats is of such a type that the seat is formed in tooth spaces, and is from all sides limited by side retaining walls. In these seats the active chain links rest. These are sometimes called lying chain links.

The results of tests on the work of known sprocket wheels show that the profile of the teeth and seats of the sprocket-wheel cause considerable problems and difficulties in the operation of the sprocket-wheel. These problems and difficulties increase with progress of the wear of chains and sprocket-wheels, and thereby reduces the performance thereof. It results in short life of the chains and sprocket-wheels.

Known sprocket-wheels show substantial disadvantages. The effective co-operation of the sprocket-wheel with the chain occurs essentially only within small angular displacement of the sprocket-wheel, usually not exceeding the value of $2\pi/Z$, wherein Z is the number of teeth of the sprocket wheel. Actually only two teeth are loaded and the seat of the sprocket-wheel, which is situated between the teeth. The remaining teeth remaining in contact with the chain links are relieved. The form coupling occuring on small wheel sector between the teeth of the sprocket-wheel and the chain links causes development of high unitary pressures between the rubbing surfaces, as well as relatively severe transmission of pressures from the tooth in mesh with the chain onto that tooth just coming into mesh next on the sprocket-wheel.

A very substantial disadvantage of known sprocket-wheels consists also in limited possibility of free displacement of the active chain links within the seats in the sense of rotation of the sprocket-wheel. The length of the seat situated between two teeth is limited thereby. An extension of the length may be achieved only through a reduction of the thickness of the tooth. This, however, also reduces the strength and life of the sprocket-wheel. The limited ability to free displacement within the seats in the sense of rotation of the sprocket-wheel is a cause of stepwise indenting of the active chain links down into the seats in the form of wear of the chain links and of the sprocket-wheel. That occurrence causes seizing of the chain links in the seats, an intensification of the wear of the tooth surface, and necessity to employ chain pushers in drives. Disadvantageous effects of indenting and seizing of the chain links in the seats reside in generating considerable, periodical and dynamic forces in the chain.

The object of the present invention is to provide a sprocket-wheel which is free from the aforementioned disadvantages. It is also an object to eliminate chain pushers from the drive.

SUMMARY OF THE INVENTION

The objects are achieved according to the present invention by providing a sprocket-wheel with teeth and seats formed in such way that the number of teeth is smaller than that of the seats. The seats are open from one side, and are provided with a retaining wall only from the side of the tooth. The bottom lands of two adjacent seats intersect, thereby forming an edge.

In the sprocket-wheel according to the present invention, a possibility exists of free positioning the chain links independently of the wear of the seats and providing a degree of permanent elongation of the separate chain links. Due to a substantial part of the load of the chain, they carry the chain links lying in the seats between the chain links, and are coupled by friction with the sprocket-wheel. Load and wear of teeth of the sprocket-wheel are negligible.

A further advantage of the sprocket-wheel according to the present invention consists in a considerable reduction of dynamic forces acting within the chain, an increased life of both the sprocket-wheel and the chain, a simplification of the construction and production engineering of the sprocket-wheel, as well as the possibility of removing chain pushers from the drive systems.

The sprocket-wheel according to the present invention may be employed in transportation equipment and mining machines provided with coil chain drives or fish-plate chain drives.

BRIEF DESCRIPTION OF THE DRAWINGS

The invention is explained by way of an exemplary embodiment with reference to the accompanying drawing in which.

DESCRIPTION OF THE PREFERRED EMBODIMENT

Figure 1:
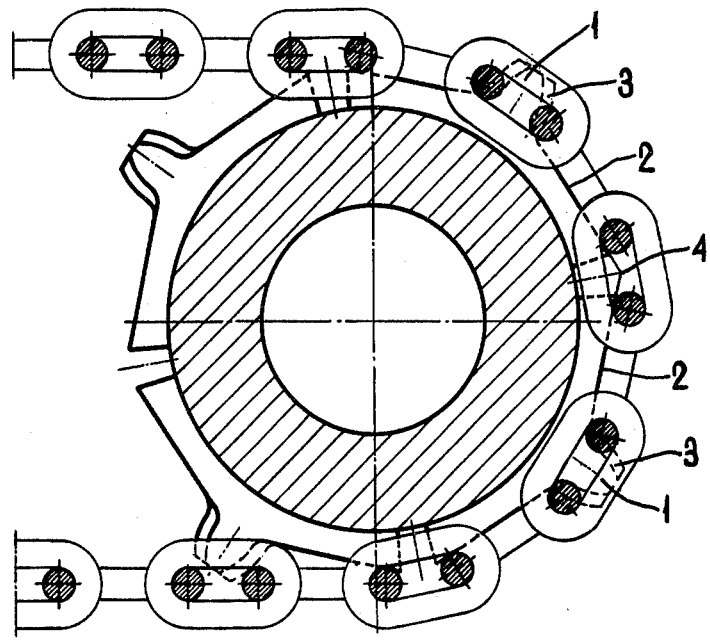
- FIG. 1 is the cross-sectional view of a sprocket-wheel.
Figure 2:
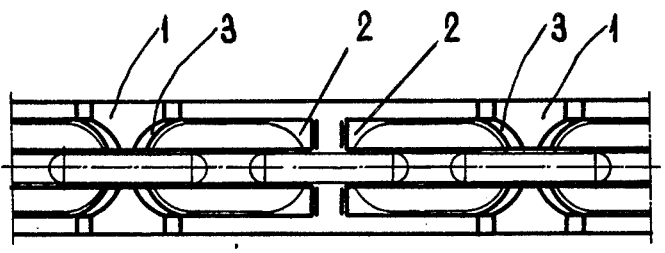
FIG. 2 is the top view thereof.

In accordance with the present invention the sprocket-wheel has a number of teeth 1 smaller than the number of seats 2. The seats 2 are open from one side and have the retaining walls 3 only from the side of teeth 1. The bottom land planes of two adjacent seats 2 intersect, thereby forming an edge 4.

What is claimed is:

1. A combination chain and sprocket wheel, particularly for driving mining machines, said chain engaging said sprocket wheel having a first set of links lying in a plane perpendicular to the axis of said sprocket wheel and a second set of links lying in planes parallel to the axis of said sprocket wheel, said links of said first and second sets alternately interlocking forming said chain, said sprocket wheel having teeth around the periphery thereof, each tooth having nonparallel flat seats on both sides thereof along the periphery of the sprocket wheel, thus providing twice as many seats as teeth, whereby each seat has on one side along the periphery of the sprocket wheel a tooth and on the other side of each seat an adjacent seat, projections of each pair of adjacent seats intersecting in a line parallel to said axis, each tooth having two prongs, alternate links of said first set lying between said prongs, the remainder of said first set of links lying along the projected lines of intersection of adjacent seats, each link of said second set lying on a seat, wherein the wear of said teeth is relatively small compared to the wear of teeth on said wheel when the number of teeth are not smaller than the number of seats.

2. The combination chain and sprocket wheel as defined in claim 1 wherein said teeth have retaining walls at the junction of said seats.

* * * * *